United States Patent
Takai et al.

(10) Patent No.: US 11,822,314 B2
(45) Date of Patent: Nov. 21, 2023

(54) CONVEYANCE CONTROL SYSTEM, CONVEYANCE CONTROL PROGRAM, AND CONVEYANCE CONTROL METHOD

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Mikio Honda, Toyota (JP); Shiro Oda, Anjyo (JP); Tetsuya Taira, Nagakute (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 624 days.

(21) Appl. No.: 17/097,118

(22) Filed: Nov. 13, 2020

(65) Prior Publication Data

US 2021/0157300 A1   May 27, 2021

(30) Foreign Application Priority Data

Nov. 25, 2019  (JP) .................................. 2019-212517

(51) Int. Cl.
*G05B 19/41* (2006.01)
*G05B 19/4155* (2006.01)
*G07C 9/00* (2020.01)

(52) U.S. Cl.
CPC ..... *G05B 19/4155* (2013.01); *G07C 9/00182* (2013.01); *G05B 2219/50391* (2013.01)

(58) Field of Classification Search
CPC ...... G05B 19/4155; G05B 2219/50391; G07C 9/00182
See application file for complete search history.

(56) References Cited

U.S. PATENT DOCUMENTS

| 9,618,931 B2 | 4/2017 | Zini et al. | |
| 11,027,420 B2 * | 6/2021 | Skaaksrud | ............... G07C 9/27 |
| 2018/0165637 A1 * | 6/2018 | Romero | ............. G06Q 10/0833 |
| 2019/0066045 A1 | 2/2019 | Cantrell | |
| 2019/0164368 A1 | 5/2019 | Ruth | |
| 2019/0244460 A1 | 8/2019 | Kaneko et al. | |
| 2019/0283252 A1 * | 9/2019 | Skaaksrud | ........... B65D 90/023 |

(Continued)

FOREIGN PATENT DOCUMENTS

| JP | 2001-287183 A | 10/2001 |
| JP | 2004-51247 A | 2/2004 |
| JP | 2019-131391 A | 8/2019 |

*Primary Examiner* — Kyle O Logan
(74) *Attorney, Agent, or Firm* — Oliff PLC

(57) ABSTRACT

A conveyance control system according to the present disclosure is a conveyance control system configured to control a conveyance robot to autonomously move and convey a conveyance object to a destination, the conveyance control system including: a reception unit configured to receive, from a scheduled recipient of the conveyance object, a request signal for requesting a third party to collect the conveyance object halfway through conveyance of the conveyance object; and an issuance unit configured to issue, to a terminal of the third party, a temporary electronic key for enabling the conveyance object to be taken out from the conveyance robot based on a set condition when the reception unit receives the request signal.

8 Claims, 15 Drawing Sheets

ACCEPTER

(56) References Cited

U.S. PATENT DOCUMENTS

2019/0287063 A1\* 9/2019 Skaaksrud ......... G06Q 10/0875
2021/0150834 A1\* 5/2021 Bates ................. E05B 47/0607
2021/0157300 A1\* 5/2021 Takai .................... G06Q 50/28

\* cited by examiner

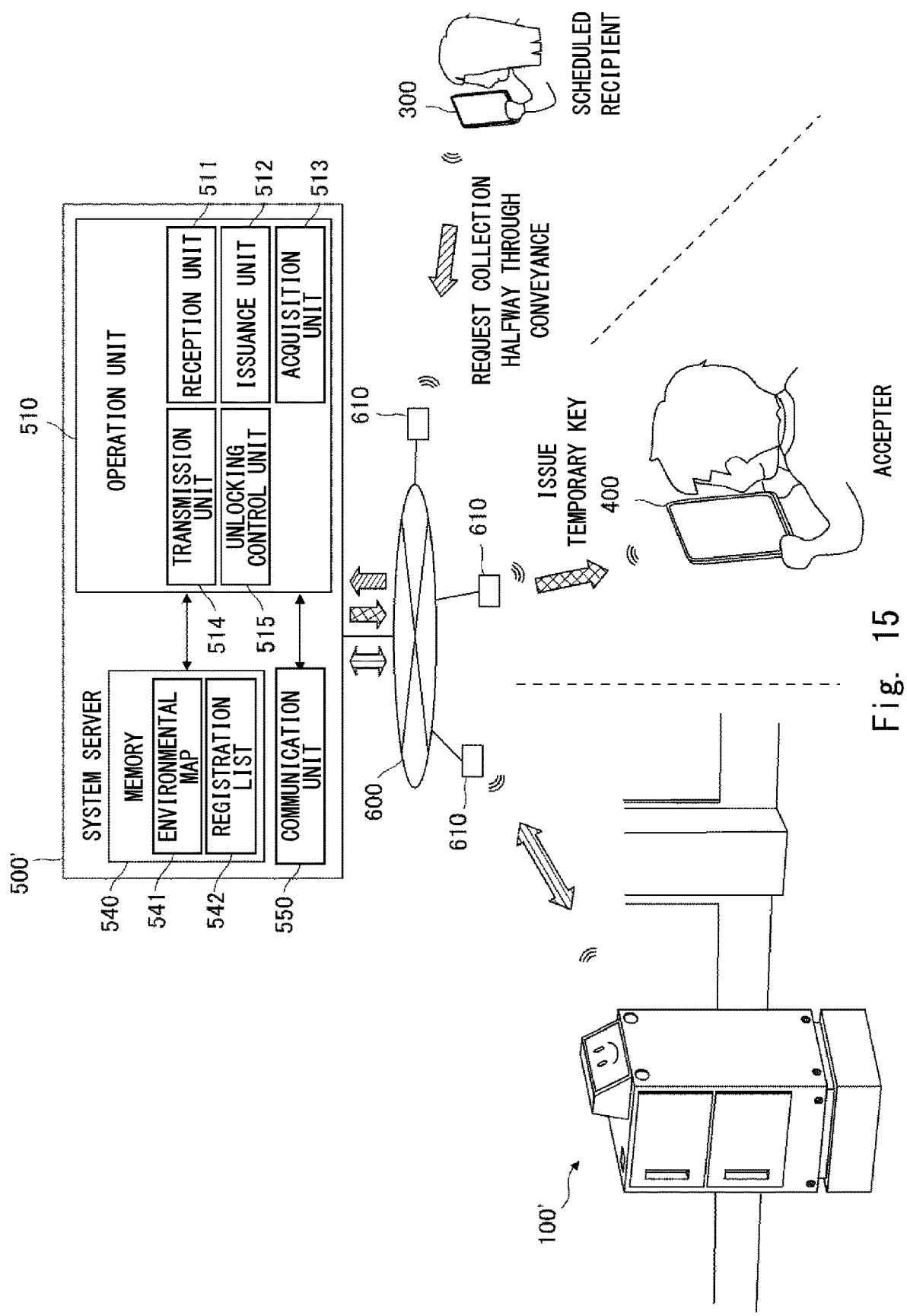

CONVEYANCE CONTROL SYSTEM, CONVEYANCE CONTROL PROGRAM, AND CONVEYANCE CONTROL METHOD

CROSS REFERENCE TO RELATED APPLICATIONS

This application is based upon and claims the benefit of priority from Japanese patent application No. 2019-212517, filed on Nov. 25, 2019, the disclosure of which is incorporated herein in its entirety by reference.

BACKGROUND

The present disclosure relates to a conveyance control system, a conveyance control program, and a conveyance control method.

A conveyance robot that automatically conveys a conveyance object (i.e., an object to be conveyed) to a destination is known. For example, after the conveyance robot conveys a conveyance object to the destination, the conveyance robot opens its own storage door and permits a person to take out the conveyance object therefrom only when the conveyance robot can recognize the person is a person who is registered in advance (e.g., see Japanese Unexamined Patent Application Publication No. 2001-287183).

SUMMARY

When the conveyance robot is configured so as to move at a relatively low speed, or when the conveyance robot is configured so as to move at a relatively high speed but it has to move a long distance, a scheduled recipient of a conveyance object (i.e., a person who is scheduled to receive a conveyance object) may not be able to wait until the conveyance robot reaches the destination. However, the scheduled recipient may not be able to go to a place where the conveyance robot is conveying the conveyance object and collect the conveyance object as soon as possible.

The present disclosure has been made to solve the above-described problem, and it provides a conveyance control system and the like that enable a scheduled recipient to request a third party to collect a conveyance object as soon as possible at the stage where a conveyance robot is still conveying the conveyance object; that is, at the stage before it arrives at the destination.

A first exemplary aspect is a conveyance control system configured to control a conveyance robot to autonomously move and convey a conveyance object to a destination, the conveyance control system including: a reception unit configured to receive, from a scheduled recipient of the conveyance object, a request signal for requesting a third party to collect the conveyance object halfway through conveyance of the conveyance object; and an issuance unit configured to issue, to a terminal of the third party, a temporary electronic key for enabling the conveyance object to be taken out from the conveyance robot based on a set condition when the reception unit receives the request signal. If an electronic key that can be used only for enabling collection of the conveyance object halfway through conveyance of the conveyance object is issued to the third party in this way, it is possible to quickly collect the conveyance object with the cooperation of the third party and protect the conveyance object at the same time.

In the aforementioned conveyance control system, the issuance unit may issue the electronic key to the terminal of the third party located within a reference range from the conveyance robot. If it is possible to request the third party who is in the vicinity of the conveyance robot to collect the conveyance object, the conveyance object can be collected more quickly. Further, the issuance unit can also issue the electronic key to the terminal of the third party registered in a registration list. If the third party is the registered person, it is possible to request him/her to collect the conveyance object without any feeling of anxiety.

The aforementioned conveyance control system can also be configured so that it includes: an acquisition unit configured to acquire imaging data obtained by shooting the third party who has come to collect the conveyance object halfway through conveyance of the conveyance object; a transmission unit configured to transmit the imaging data to a terminal of the scheduled recipient; and an unlocking control unit configured to, when the transmission unit has transmitted the imaging data and then the reception unit receives a permission signal indicating that permission to perform unlocking is given from the scheduled recipient, perform unlocking with the electronic key. By this configuration, a requester, who is the scheduled recipient of the conveyance object, can confirm who is to collect the conveyance object, and further he/she can always know the current location of the conveyance object.

In this case, the unlocking control unit may determine, based on an attribute set in the conveyance object, whether to perform unlocking with the electronic key when the reception unit receives the permission signal or to perform unlocking with the electronic key without the reception unit receiving the permission signal. By making the unlocking operation for the conveyance object that is not allowed to be lost different from that for the conveyance object that is allowed to be lost in this way, it is possible to enhance both safety and convenience. Note that the transmission unit may transmit the imaging data to the terminal of the scheduled recipient even when the unlocking control unit performs unlocking with the electronic key without the reception unit receiving the permission signal indicating that permission to perform unlocking is given from the scheduled recipient. As the scheduled recipient can confirm the person who collects the conveyance object by his/her own terminal, the scheduled recipient can easily recognize from whom the conveyance object should be received.

A second exemplary aspect is a conveyance control program for controlling a conveyance robot to autonomously move and convey a conveyance object to a destination, the conveyance control program causing a computer to execute: a movement step of causing the conveyance robot to move toward the destination; a check step of checking, while the movement step is being executed, whether a request signal for requesting a third party to collect the conveyance object halfway through conveyance of the conveyance object is received from a scheduled recipient of the conveyance object; and an issuance step of issuing, to a terminal of the third party, a temporary electronic key for enabling the conveyance object to be taken out from the conveyance robot based on a set condition when it is confirmed that the request signal has been received in the check step.

A third exemplary aspect is a conveyance control method for controlling a conveyance robot to autonomously move and convey a conveyance object to a destination, the conveyance control method including: a movement step of causing the conveyance robot to move toward the destination; a check step of checking, while the movement step is being executed, whether a request signal for requesting a third party to collect the conveyance object halfway through conveyance of the conveyance object is received from a scheduled recipient of the conveyance object; and an issuance step of issuing, to a terminal of the third party, a temporary electronic key for enabling the conveyance object to be taken out from the conveyance robot based on a set condition when it is confirmed that the request signal has been received in the check step. In the above second and third aspects, it is also possible to quickly collect the conveyance object with the cooperation of the third party and protect the conveyance object at the same time.

According to the present disclosure, it is possible to provide a conveyance control system and the like that enable a scheduled recipient to request a third party to collect a conveyance object as soon as possible at the stage where a conveyance robot is still conveying the conveyance object; that is, at the stage before it arrives at the destination.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 15 is a diagram for explaining another embodiment.

DESCRIPTION OF EMBODIMENTS

Hereinafter, although the present disclosure will be described with reference to an embodiment of the present disclosure, the present disclosure according to claims is not limited to the following embodiment. Further, all the components described in the following embodiment are not necessarily essential as means for solving problems.

Figure 1:
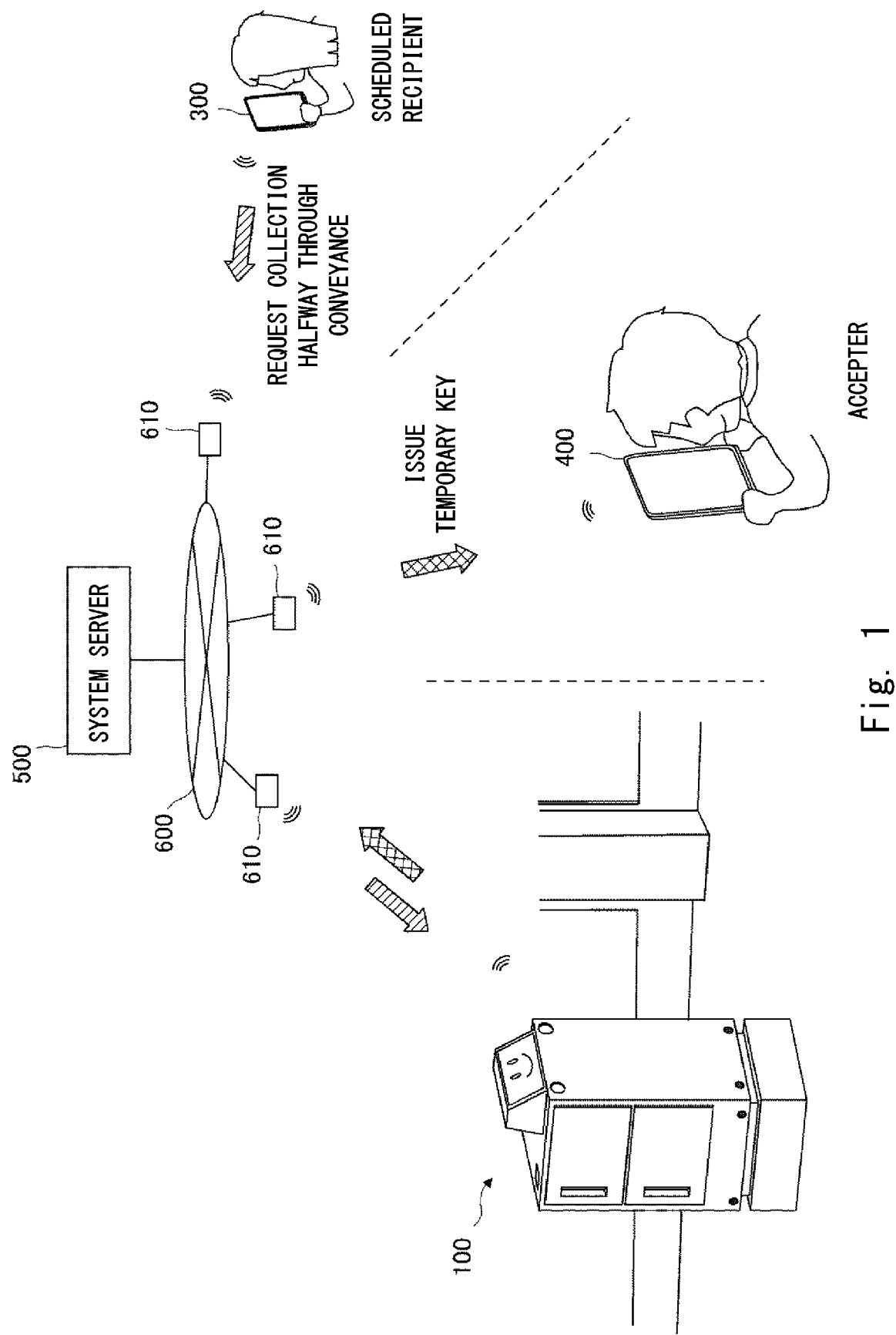
FIG. 1 is a conceptual diagram for explaining an overall configuration in which a conveyance robot according to an embodiment is used.

FIG. 1 is a conceptual diagram for explaining an overall configuration in which a conveyance robot 100 according to this embodiment is used. The conveyance robot 100 autonomously moves and conveys a conveyance object stored therein to a destination that has been set. When the conveyance robot 100 arrives at the set destination, a scheduled recipient of the conveyance object can collect the stored conveyance object.

When the conveyance robot is configured so as to move at a relatively low speed or when the conveyance robot is configured so as to move at a relatively high speed but it has to move a long distance, the conveyance performed by the conveyance robot takes time. Thus, the scheduled recipient may want to collect the conveyance object as soon as possible even if he/she has to go to a place where the conveyance robot 100 is conveying the conveyance object. However, due to various reasons, it is sometimes difficult for him/her to go to the place where the conveyance object is and collect the conveyance object. In such a case, the scheduled recipient operates his/her own user terminal 300, and transmits, from the user terminal 300 to the conveyance robot 100, a request signal for requesting a third party to collect the conveyance object halfway through conveyance of the conveyance object. Upon receiving the request signal, the conveyance robot 100 issues a temporary electronic key (hereinafter referred to as a "temporary key") for enabling the conveyance object to be taken out from the conveyance robot 100 to a user terminal 400 of the third party based on a set condition. The third party who accepts the above request goes, as a person who has accepted the request (hereinafter referred to as an accepter), to the place where the conveyance robot 100 is located, collects the conveyance object halfway through conveyance of the conveyance object, and delivers it to the scheduled recipient. As described above, by having the third party collect the conveyance object halfway through conveyance of the conveyance object on behalf of the scheduled recipient, it can be expected that the scheduled recipient will be able to receive the conveyance object before the conveyance robot 100 arrives at the destination. Further, as the temporary key is issued to a trusted third party based on the set condition, it is possible to protect the conveyance object.

In this embodiment, the conveyance robot 100, the user terminal 300 of the scheduled recipient, and the user terminal 400 of the accepter (including a candidate for the accepter) are connected to each other via a system server 500 connected to a network 600. Various kinds of signals transmitted from the user terminal 300 of the scheduled recipient and the user terminal 400 of the accepter are once sent to the system server 500 via the network 600 and are transferred from the system server 500 to the target conveyance robot 100. Similarly, various kinds of signals transmitted from the conveyance robot 100 are once sent to the system server 500 via the network 600 and are transferred from the system server 500 to the target user terminal 300 of the scheduled recipient and the target user terminal 400 of the accepter. The conveyance robot 100 and the user terminals 300 and 400 are connected to the network 600 by radio communication via communication units 610 which are, for example, wireless LAN units installed in the respective environments.

By the overall configuration described above, the elements for enabling the collection of the conveyance object halfway through conveyance of the conveyance object are distributed to the conveyance robot 100, the user terminals 300 and 400, and the system server 500, whereby it is possible to construct the conveyance control system as a whole. Further, the elements for substantially enabling the collection of the conveyance object halfway through conveyance of the conveyance object are assembled in one apparatus, whereby it is possible to construct the conveyance control system. Therefore, in this embodiment, a case in which the conveyance robot 100 includes the elements for substantially implementing the collection of the conveyance object halfway through conveyance of the conveyance object will be described first. That is, a case in which the conveyance control system is substantially implemented by the conveyance robot 100 will be described.

Figure 2:
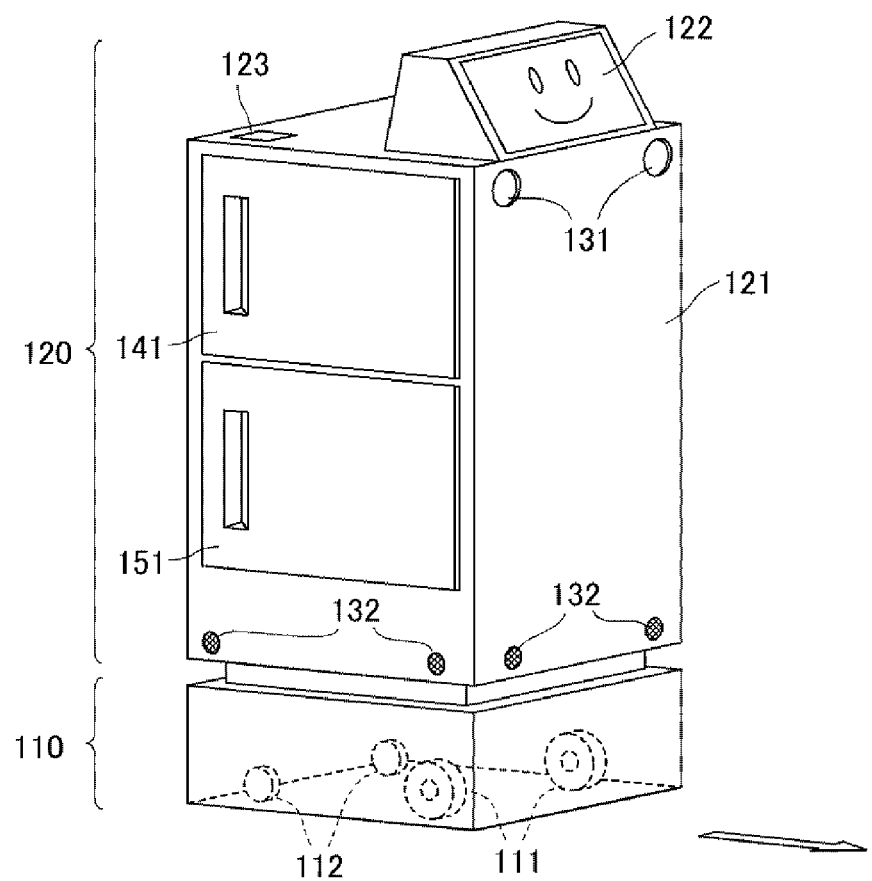
FIG. 2 is an external perspective view showing the conveyance robot according to the embodiment being in a locked state.

FIG. 2 is an external perspective view showing the conveyance robot 100 according to this embodiment being in a locked state. The conveyance robot 100 is an autonomous mobile body that can move autonomously. The conveyance robot 100 is mainly composed of a movable base part 110 and a main-body part 120.

The movable base part 110 supports two driving wheels 111 and two casters 112, each of which is in contact with the traveling surface, inside its rectangular shaped cover. The two driving wheels 111 are arranged so that the centers of their rotation axes coincide with each other. The two driving wheels 111 are arranged so that the centers of their rotation axes coincide with each other. Each of the caster 112 is a driven wheel and is disposed so that its pivotal axis extending from the movable base part 110 in the vertical direction axially supports the wheel at a place away from its rotation axis. Further, the casters 112 follow the movable base part 110 in accordance with the direction in which the movable base part 110 moves.

The conveyance robot 100 goes straight forward when, for example, the two driving wheels 111 are rotated at the same rotational speed in the same direction, and turns around the vertical axis that passes approximately the center of the two driving wheels 111 of the movable base part 110 when, for example, they are rotated at the same rotational speed in the opposite directions. That is, the conveyance robot 100 can move parallel to and rotate in any direction by controlling the rotational directions and the rotation speeds of each of the two driving wheels 111.

The main-body part 120 mainly includes a housing part 121 mounted on the upper part of the movable base part 110 and a display panel 122 installed on the upper surface of the housing part 121. The housing part 121 has a rectangular parallelepiped shape and includes therein racks for storing a conveyance object and a control box storing a control unit and the like which will be described later. The racks for storing a conveyance object are respectively housed in an upper-row storage part and a lower-row storage part that are partitioned from each other and are respectively closed by an upper-row door 141 and a lower-row door 151 at the time of conveyance. An electronic key (hereinafter referred to as an "authorized key") for unlocking an electronic lock provided on each of these doors is stored in the user terminal 300, and the scheduled recipient can open the door corresponding to the authorized key by bringing the user terminal 300 close to a terminal reading unit 123. Further, the accepter can open the door corresponding to the temporary key by bringing the user terminal 400 storing the temporary key close to the terminal reading unit 123.

The display panel 122 is, for example, a liquid crystal display panel, and displays a face of a character and displays information about the conveyance robot 100 in the form of text or by using icons. By displaying the face of the character on the display panel 122, it is possible to impart an impression that the display panel 122 is a pseudo face part to people around the conveyance robot 100. Further, the display panel 122 includes a touch panel on the display surface and can receive an input instruction from a user.

A stereo camera 131 is installed in an upper part of the housing part 121 but below the display surface of the display panel 122. The stereo camera 131 has a structure in which two camera units having the same angle of view are arranged so as to be away from each other, and outputs images shot by each of the camera units as image data. At the lower part of the housing part 121, ultrasonic sensors 132 directed toward the horizontal direction are provided on the respective surfaces of the housing part 121. The conveyance robot 100 analyzes image data output from the stereo camera 131 and detection signals output from the ultrasonic sensors 132, thereby recognizing surrounding obstacles and identifying (i.e., determining) the position of the conveyance robot 100. As shown in FIG. 2, the side of the conveyance robot 100 in which the stereo camera 131 is installed is the front thereof. That is, in a normal movement of the conveyance robot 100, the front direction of the conveyance robot 100 is the traveling direction thereof as indicated by an arrow.

Figure 3:
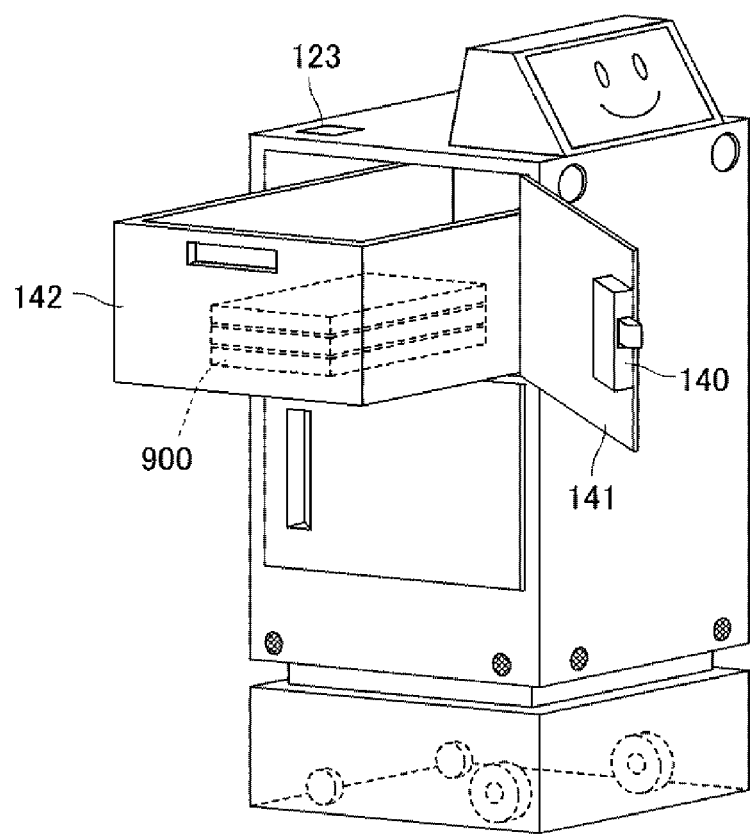
FIG. 3 is an external perspective view showing the conveyance robot according to the embodiment being in an unlocked state.

FIG. 3 is an external perspective view showing the conveyance robot 100 according to this embodiment being in an unlocked state. In particular, FIG. 3 shows a state in which an upper-row electronic lock 140 is unlocked, the upper-row door 141 is thus opened, and then an upper-row rack 142 housed in the upper-row storage part is pulled out. A conveyance object 900 is stored in the upper-row rack 142, and the scheduled recipient or the accepter pulls out the upper-row rack 142 and collects the conveyance object 900 therefrom. The structure of the lower-row storage part is the same as that of the upper-row storage part.

Figure 4:
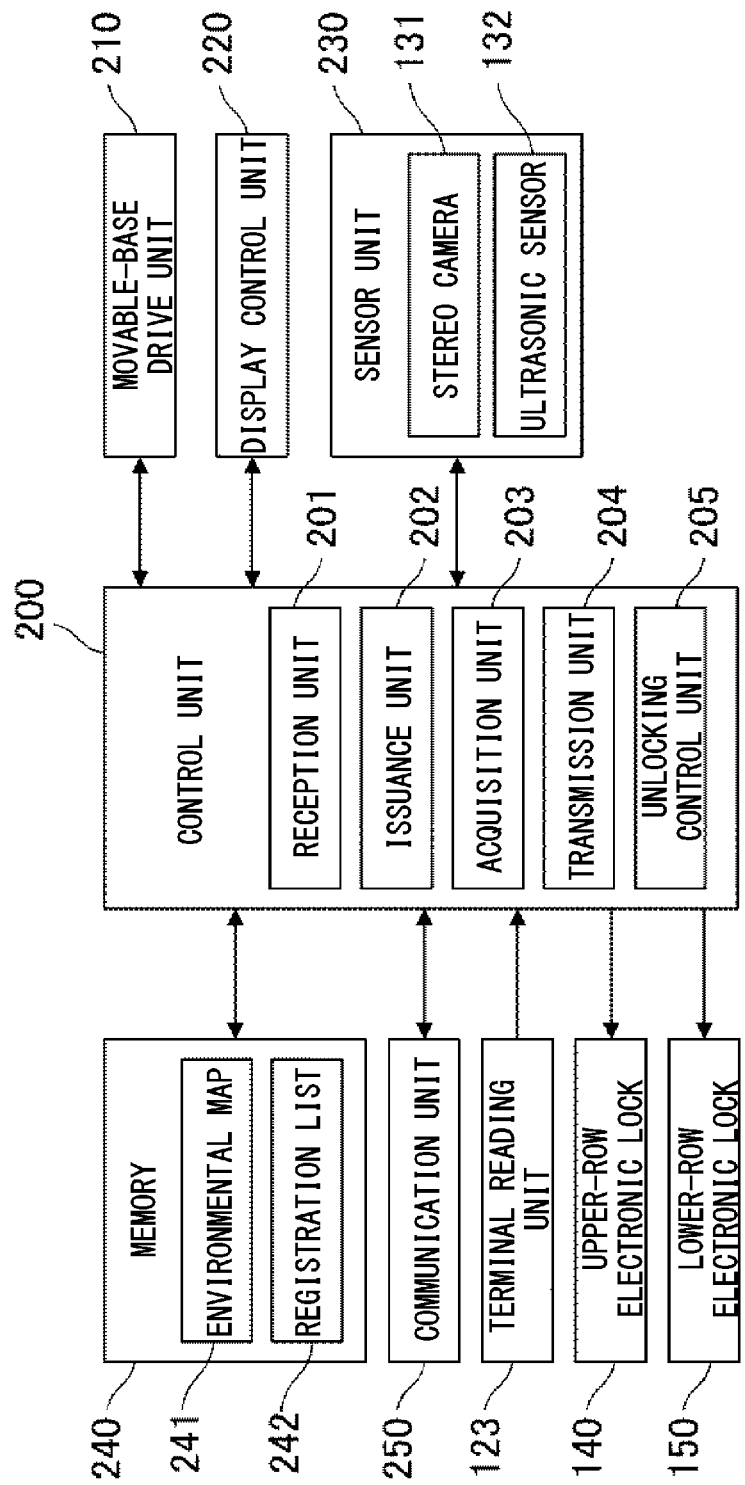
FIG. 4 is a control block diagram of the conveyance robot.

FIG. 4 is a control block diagram of the conveyance robot 100. A control unit 200 is, for example, a CPU, and executes a control program loaded from a memory 240, thereby controlling the entire apparatus. A movable-base drive unit 210 includes a driving circuit and a motor for driving the driving wheels 111. A display control unit 220 generates a display video image in accordance with a control signal sent from the control unit 200 and displays the generated display video image on the display panel 122. Further, the display control unit 220 receives an operation on the touch panel superimposed on the display panel 122, generates an operation signal, and transmits the generated operation signal to the control unit 200.

A sensor unit 230 includes various sensors that detect people and objects present around the conveyance robot 100 and that monitor conveyance objects. The stereo camera 131 and the ultrasonic sensor 132 are components of the sensor unit 230. The control unit 200 drives the various sensors by transmitting a control signal to the sensor unit 230 and then acquires signals and data output from the sensors.

The memory 240 is a nonvolatile storage medium. For example, a solid-state drive is used for the memory 240. The memory 240 stores, in addition to a control program for controlling the conveyance robot 100, various parameter values, functions, lookup tables, and the like used for the control. In particular, the memory 240 stores an environmental map 241 which describes map information of an environment in which the conveyance robot 100 autonomously moves. Further, the memory 240 stores a registration list 242 in which candidates for the accepter and his/her user terminals 400 are registered in association with each other.

A communication unit 250 includes a network connection unit which is, for example, a wireless LAN unit. The control unit 200 can transmit and receive various kinds of information to and from the system server 500 connected to the network 600 via the communication unit 250. Further, the communication unit 250 includes a near field communication unit which is, for example, Bluetooth (registered trade mark). The control unit 200 can directly transmit and receive various kinds of information with the user terminals 300 and 400 located within a range of, for example, about 10 m from conveyance robot 100 via the communication unit 250.

The terminal reading unit 123 is a reading apparatus for near field communication for reading information from the user terminals 300 and 400 when the user terminals 300 and 400 are brought close to the terminal reading unit 123. Each of the user terminals 300 and 400 includes, for example, a FeliCa (registered trademark) chip mounted thereon, and passes information of the stored temporary key or authorized key to the control unit 200 via the terminal reading unit 123.

The control unit 200 also serves as a function operation unit that executes various operations regarding control and processing. Examples of the function operation unit include a reception unit 201, an issuance unit 202, an acquisition unit 203, a transmission unit 204, and an unlocking control unit 205. The reception unit 201 receives a request signal for requesting a third party to collect the conveyance object halfway through conveyance of the conveyance object from the scheduled recipient of the conveyance object. Specifically, the reception unit 201 receives the request signal generated by the scheduled recipient operating the user terminal 300 via the system server 500 and the communication unit 250. When the reception unit 201 receives the request signal, the issuance unit 202 issues the temporary key to the user terminal 400 of the candidate for the accepter in accordance with the set condition. The acquisition unit 203 cooperates with the stereo camera 131 to shoot the accepter who has come to collect the conveyance object halfway through conveyance of the conveyance object, and acquires imaging data of the accepter. The transmission unit 204 transmits the imaging data acquired by the acquisition unit 203 to the user terminal 300 of the scheduled recipient via the communication unit 250. The unlocking control unit 205 unlocks the upper-row electronic lock 140 when the information of the temporary key or the authorized key read by the terminal reading unit 123 coincides with the unlocking information of the upper-row electronic lock 140, and unlocks a lower-row electronic lock 150 when the information of the temporary key or the authorized key read by the terminal reading unit 123 coincides with the unlocking information of the lower-row electronic lock 150.

Next, processes to be performed when the reception unit 201 receives a request signal from the user terminal 300 while the conveyance robot 100 storing the conveyance object is moving toward the destination are described with reference to two examples. In this embodiment, the reception of the request signal and the issuance of the temporary key to be performed upon receiving the request signal are performed by the conveyance robot 100. These processes executed by the conveyance robot 100 will be described below with reference to user interface screens displayed by the user terminal 300 of the scheduled recipient and the user terminal 400 of the accepter.

Figure 5:
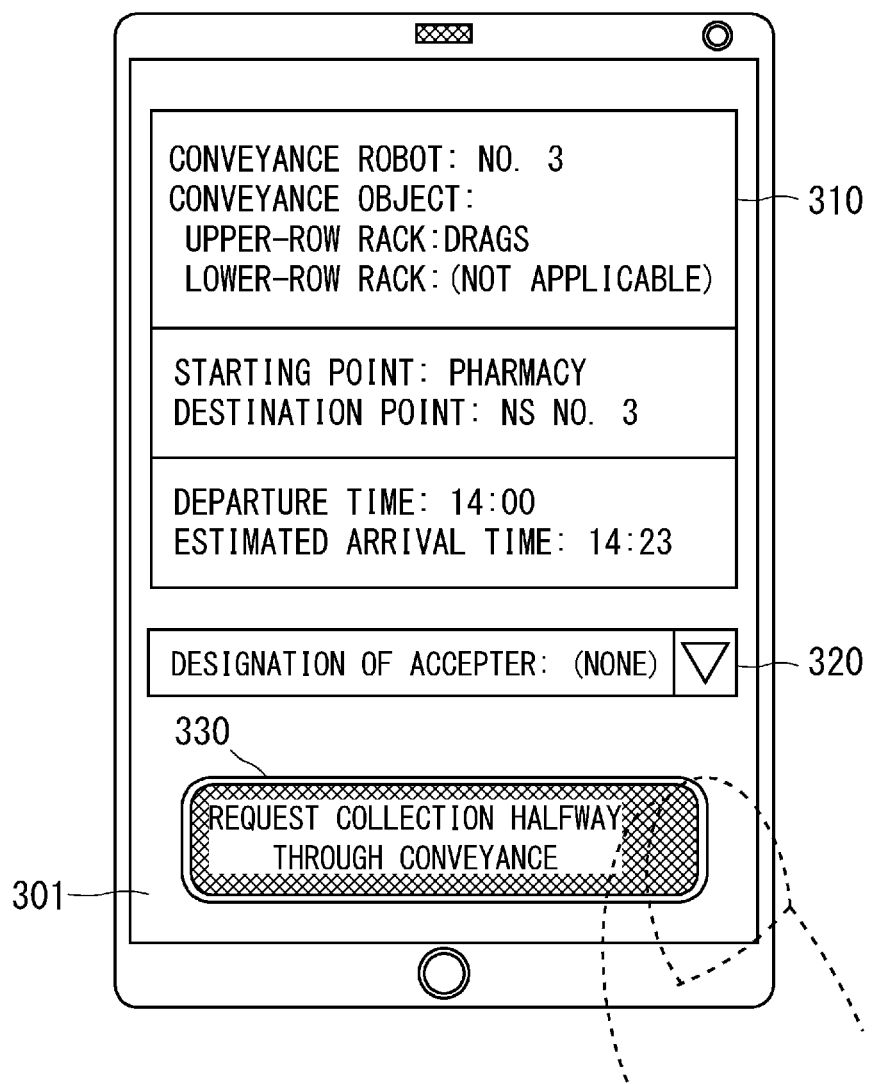
FIG. 5 is an example of a user interface screen for requesting that a conveyance object be collected halfway through conveyance of the conveyance object.

First, a first example is described. FIG. 5 is an example of the user interface screen for requesting that the conveyance object be collected halfway through conveyance of the conveyance object, the user interface screen being displayed on a display panel 301 of the user terminal 300. If the scheduled recipient desires to request a third party to collect the conveyance object halfway through conveyance of the conveyance object in order to collect the conveyance object as soon as possible, he/she calls this user interface screen from the user terminal 300.

As shown in FIG. 5, a status window 310, a designation window 320, and a request button 330 are arranged on the display panel 301. The status window 310 displays the name of the conveyance robot that conveys the conveyance object to be received by the scheduled recipient, the content of the conveyance object, the starting point and the destination point of the conveyance, and the departure time and the estimated arrival time of the conveyance robot. At the starting point, a shipping worker packs the conveyance object into the storage part of the housing part 121, and inputs information about the scheduled recipient, the content of the conveyance object, and the like to the conveyance robot 100. The control unit 200 of the conveyance robot 100 transmits the input information pieces to the system server 500, and the system server 500 transmits these information pieces related to the scheduled recipient to the user terminal 300 according to a request from the user terminal 300.

The designation window 320 is a window for selecting and designating a third party who is to be requested to collect the conveyance object halfway through conveyance of the conveyance object. The scheduled recipient can select and designate a specific candidate from among a plurality of candidates for the accepter, which are shown by, for example, tapping an inverted triangle button in FIG. 5. The plurality of candidates for the accepter are some or all of the candidates for the accepter registered in the registration list 242 sent from the conveyance robot 100. Alternatively, the plurality of candidates for the accepter are some or all of the candidates registered in advance in the user terminal 300. The scheduled recipient may select not to designate a specific candidate for the accepter as shown in FIG. 5.

The request button 330 is a button for generating, by a tap operation of the scheduled recipient, a request signal for requesting that the conveyance object be collected halfway through conveyance of the conveyance object, and "request collection halfway through conveyance" is displayed in text form on the request button 330. Tapping the request button 330 causes the request signal to be transmitted to the conveyance robot 100 via the system server 500. The request signal includes information of the candidate for the accepter or information indicating that no candidate for the accepter has been designated.

When the reception unit 201 of the conveyance robot 100 receives the request signal, it notifies the issuance unit 202 about the receiving of the signal, and the issuance unit 202 starts a process for issuing the temporary key in response to this notification. The issuance unit 202 first checks whether the information of the designated candidate for the accepter is included in the request signal, and if it is confirmed that this information is included, the issuance unit 202 specifies the user terminal 400 of this candidate by referring to the registration list 242. Then, the issuance unit 202 transmits a notification signal for notifying that the request for collection of the conveyance object halfway through conveyance of the conveyance object is received to the specified user terminal 400. When the request signal includes information indicating that no candidate for the accepter has been designated, the issuance unit 202 transmits the notification signal to the user terminals 400 of some or all of the candidates for the accepter registered in the registration list 242. When the notification signal is transmitted only to some of the candidates for the accepter, a method, for example, for checking the user terminal 400 that can perform communication in advance and selecting the owner of the user terminal 400 which is confirmed to be able to perform communication may be adopted.

When a specific candidate for the accepter has not been designated, various method for selecting the user terminal 400 to which the notification signal is transmitted may be performed other than the method for selecting it based on the registration list 242. For example, the user terminal 400 that can perform communication may be searched for by using the near field communication unit included in the communication unit 250, and the user terminal 400 thus found may be selected. The range within which the near field communication can be performed is a certain range from where the conveyance robot 100 is located. When this range is used as a reference range, it is estimated that the third party present in this reference range is in the vicinity of the conveyance robot 100. That is, the above third party can be a strong candidate for the accepter who is to be requested to collect the conveyance object halfway through conveyance of the conveyance object. Note that in searching for the user terminal 400 located within a certain range from the conveyance robot 100, a terminal position estimation or the like based on a wireless LAN signal using a communication unit 610 may be used. In this case, the issuance unit 202 acquires positional information of the user terminal 400 from the system server 500.

Figure 6:
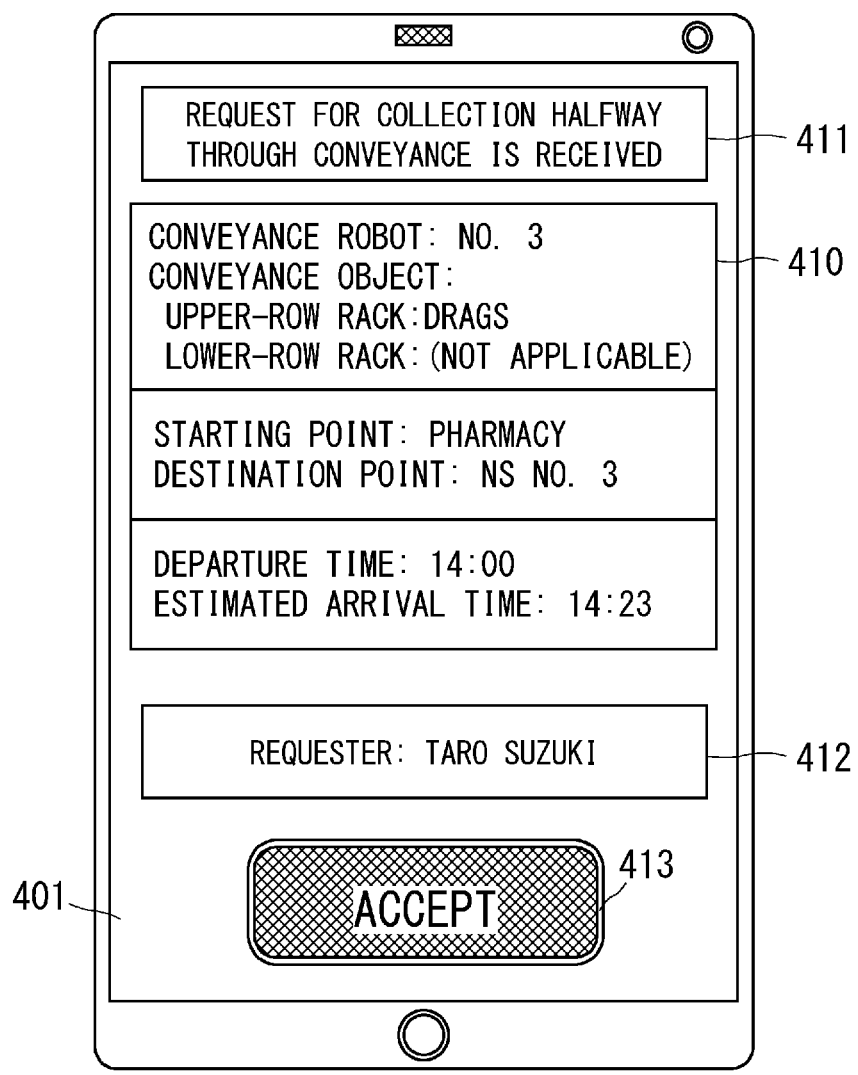
FIG. 6 shows an example of the user interface screen when a request for the collection of the conveyance object halfway through conveyance of the conveyance object is received.

When the issuance unit 202 transmits a notification signal to the user terminal 400 of the candidate for the accepter thus selected, the user terminal 400 that has been received the notification signal displays a notification screen for notifying the reception of the request for the collection of the conveyance object halfway through conveyance of the conveyance object on a display panel 401. FIG. 6 shows an example of the user interface screen displayed on the display panel 401 of the user terminal 400 when the request for the collection of the conveyance object halfway through conveyance of the conveyance object is received.

As shown in FIG. 6, a status window 410, a report window 411, a requester window 412, and an acceptance button 413 are arranged on the display panel 401. The status window 410 is similar to the status window 310 displayed on the user terminal 300 of the scheduled recipient, and displays the name of the conveyance robot that conveys the conveyance object, the content of the conveyance object, the starting point and the destination point of the conveyance, and the departure time and the estimated arrival time of the conveyance robot. The issuance unit 202 of the conveyance robot 100 transmits these information pieces to the user terminal 300 via the system server 500.

The report window 411 displays information which the conveyance robot 100 has sent a notification about, and in FIG. 6, it displays information indicating that the request for collection of the conveyance object halfway through conveyance of the conveyance object has been received. The requester window 412 displays who has requested the collection of the conveyance object halfway through conveyance of the conveyance object. The candidate for the accepter can determine from the name shown in the requester window 412 to whom the conveyance object should be delivered if he/she accepts the request for the collection of the conveyance object halfway through conveyance of the conveyance object.

The acceptance button 420 is a button for generating, by a tap operation of the candidate for the accepter, an acceptance signal indicating that he/she intends to accept the work of collecting the conveyance object halfway through conveyance of the conveyance object, and "accept" is displayed in text form on the acceptance button 420. Tapping the acceptance button 420 causes the acceptance signal to be transmitted to the conveyance robot 100 via the system server 500. The acceptance signal includes specific information for specifying the user terminal 400 which has transmitted this acceptance signal.

When the reception unit 201 of the conveyance robot 100 receives the acceptance signal, it notifies the issuance unit 202 about the receiving of the signal, and the issuance unit 202 determines the accepter in response to this notification. For example, when the issuance unit 202 transmits notification signals to the user terminals 400 of the plurality of candidates for the accepter, the issuance unit 202 specifies, by referring to specific information included in the earliest-received acceptance signal, the user terminal 400 which has transmitted this acceptance signal, and determines the owner of the specified user terminal 400 to be the accepter. In this case, the issuance unit 202 may transmit a notification that the accepter has been determined to each user terminal 400 that has transmitted the acceptance signal which the issuance unit 202 has received after the earliest-received signal. Further, when the designated candidate for the accepter does not accept the request, when none of the users who are candidates for the accepter to whom the notification signals have been transmitted to their user terminals 400 accepts the request, or when there is no user terminal 400 to which the notification signal can be transmitted, the issuance unit 202 transmits a notification that "there is no accepter" to the user terminal 300 of the scheduled recipient.

The issuance unit 202 issues the temporary keys for unlocking the electronic locks (the upper-row electronic lock 140 and the lower-row electronic lock 150) provided on the doors of the racks storing the conveyance object to be collected halfway through conveyance of the conveyance object to the user terminal 400 of the accepter. At this time, the issuance unit 202 also transmits current location information of the conveyance robot 100 to the user terminal 400. Specifically, the control unit 200 has already recognized a position (e.g., a spatial coordinate value) of the conveyance robot 100 by matching the output of the sensor unit 230 with the environmental map 241, and the issuance unit 202 transmits the recognized position to the user terminal 400 as current location information together with the map information of the vicinity of the conveyance robot 100 extracted from the environmental map 241.

Further, the issuance unit 202 transmits information about a scheduled route of the conveyance robot 100 to the destination to the user terminal 400. The control unit 200 generates a scheduled route to the destination at the start of movement of the conveyance robot 100, and corrects the scheduled route to the destination as appropriate, for example, in order to avoid the obstacles encountered during the movement. When the issuance unit 202 receives the acceptance signal, it transmits the scheduled route to the destination at this point in time to the user terminal 400 as scheduled route information together with related map information extracted from the environmental map 241.

Figure 7:
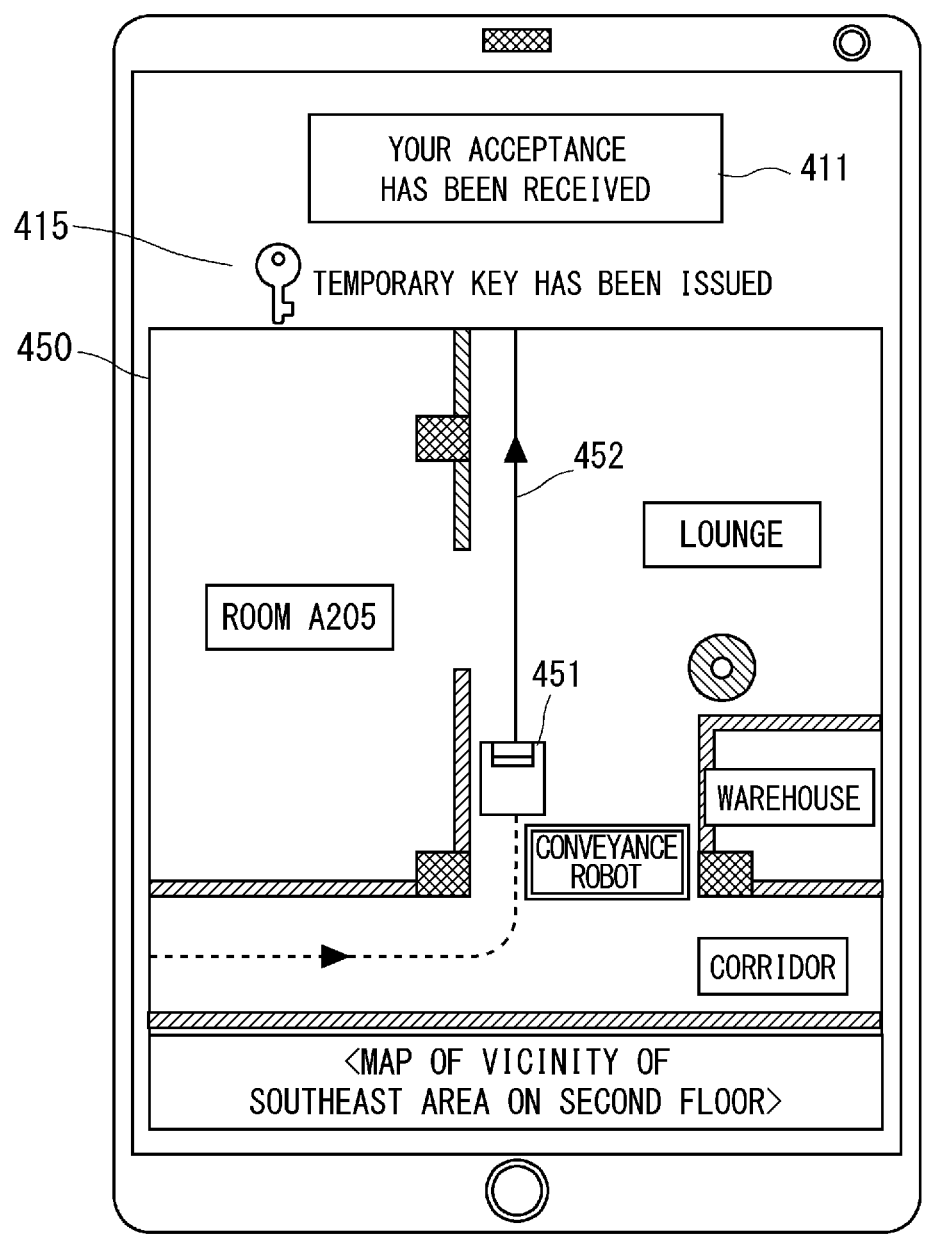
FIG. 7 shows an example of the user interface screen when the request for the collection of the conveyance object halfway through conveyance of the conveyance object is accepted.

FIG. 7 shows an example of the user interface screen displayed on the display panel 401 of the user terminal 400 when the request for the collection of the conveyance object halfway through conveyance of the conveyance object is accepted. As shown in FIG. 7, the report window 411, a key status 415, and a map window 450 are arranged on the display panel 401. The report window 411 displays a text of "your acceptance has been received" indicating that the acceptance of the request for the collection of the conveyance object halfway through conveyance of the conveyance object has been received by the conveyance robot 100. The key status 415 indicates that, in the form of text and by using an icon, a temporary key is issued by the conveyance robot 100 and is stored in the user terminal 400.

The map window 450 displays the current location of the conveyance robot 100, the scheduled route of the conveyance robot 100 to the destination, and the vicinity map by using the information received from the conveyance robot 100. The current location of the conveyance robot 100 is indicated by a conveyance robot icon 451 superimposed on the vicinity map. Further, the scheduled route to the destination is indicated by a scheduled route line 452 superimposed on the vicinity map. The vicinity map is zoomed in or out in accordance with, for example, a pinch operation of the accepter, and slides in accordance with a drag operation of the scheduled recipient. As the accepter can recognize where the conveyance robot 100 is currently moving through the above-described user interface screen, he/she can easily determine where to go in order to meet the conveyance robot 100. Further, if the accepter confirms the scheduled route, he/she can more easily meet the conveyance robot 100, for example, by tracing the route in the reverse direction.

Figure 8:
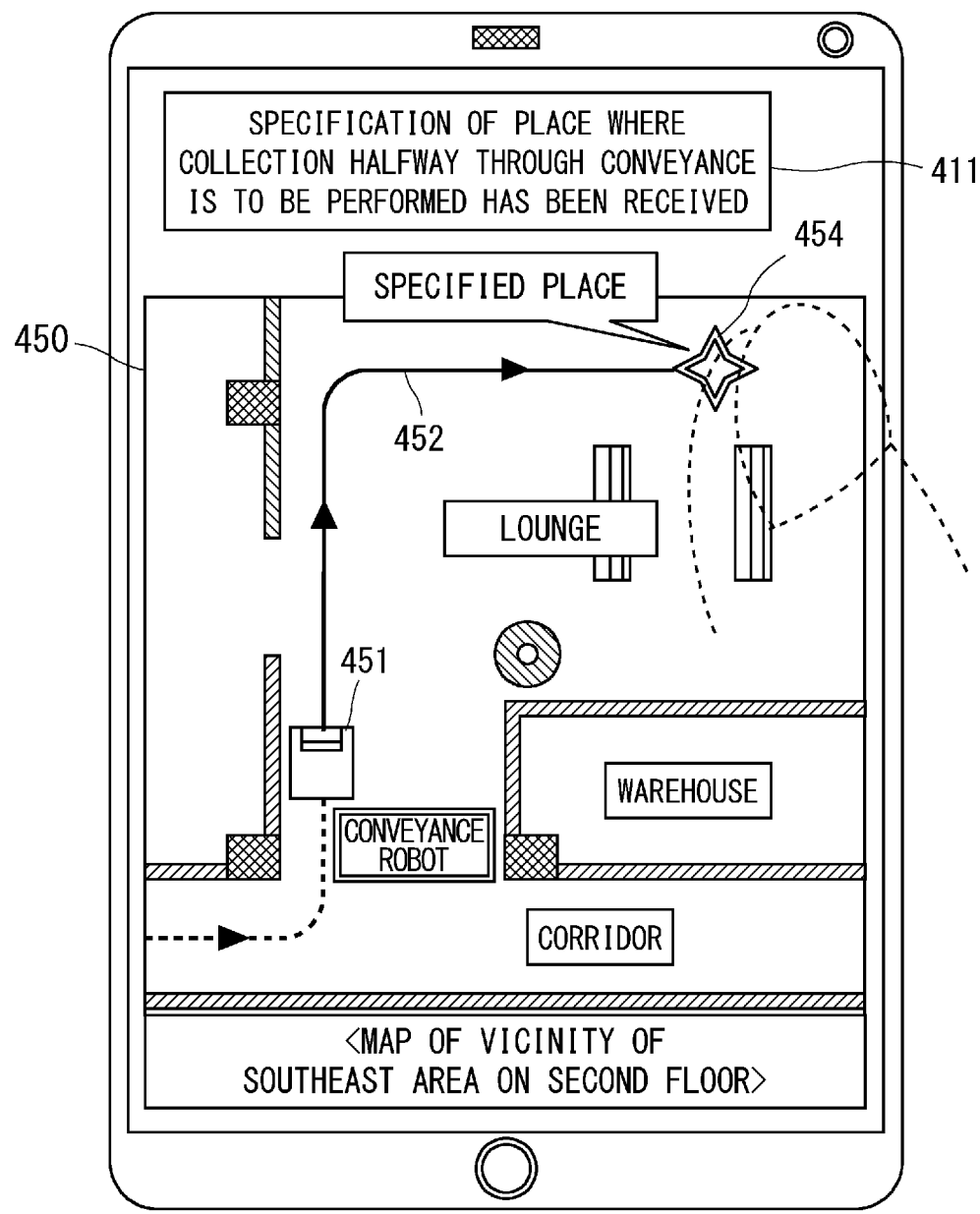
FIG. 8 is an example of the user interface screen for specifying a place where the conveyance object is to be collected halfway through conveyance of the conveyance object.

The accepter can also specify a place where the conveyance object is to be collected halfway through conveyance of the conveyance object through the user terminal 400. FIG. 8 shows an example of the user interface screen for specifying a place where the conveyance object is to be collected halfway through conveyance of the conveyance object, which is displayed on the display panel 401 of the user terminal 400. The accepter can specify, for example, a place which is convenient for collecting the conveyance object halfway through conveyance of the conveyance object and in which the conveyance robot 100 does not disturb the surrounding people as a place where the conveyance object is to be collected halfway through conveyance of the conveyance object. The accepter finds such a place by sliding a map by a drag operation, and determines the place to be the place where the conveyance object is collected halfway through conveyance of the conveyance object by a double tap operation.

In the example shown in FIG. 8, a corner of a lounge having a relatively large space is specified as the place where the conveyance object is to be collected halfway through conveyance of the conveyance object, and a specified place icon 454 is superimposed on the specified place on the map. When the place where the conveyance object is to be collected halfway through conveyance of the conveyance object is specified, the user terminal 400 transmits information about this place to the conveyance robot 100. The control unit 200 of the conveyance robot 100 generates a scheduled route for reaching the specified place where the conveyance object is to be collected halfway through conveyance of the conveyance object, and transmits, to the user terminal 400, a notification that the specification of the place where the conveyance object is to be collected halfway through conveyance of the conveyance object has been received together with information about the generated route. The user terminal 400 notifies that the conveyance robot 100 has received the specification of the place where the conveyance object is to be collected halfway through conveyance of the conveyance object through the report window 411, and superimposes the scheduled route to the specified place on the map window 450 as the scheduled route line 452.

The control unit 200 of the conveyance robot 100 starts moving along the generated scheduled route. Then, when the conveyance robot 100 arrives at the specified place where the conveyance object is to be collected halfway through conveyance of the conveyance object, it waits until the accepter arrives. As the accepter can recognize where the conveyance robot 100 is waiting, he/she can reliably collect the conveyance object halfway through conveyance of the conveyance object.

Figure 9:
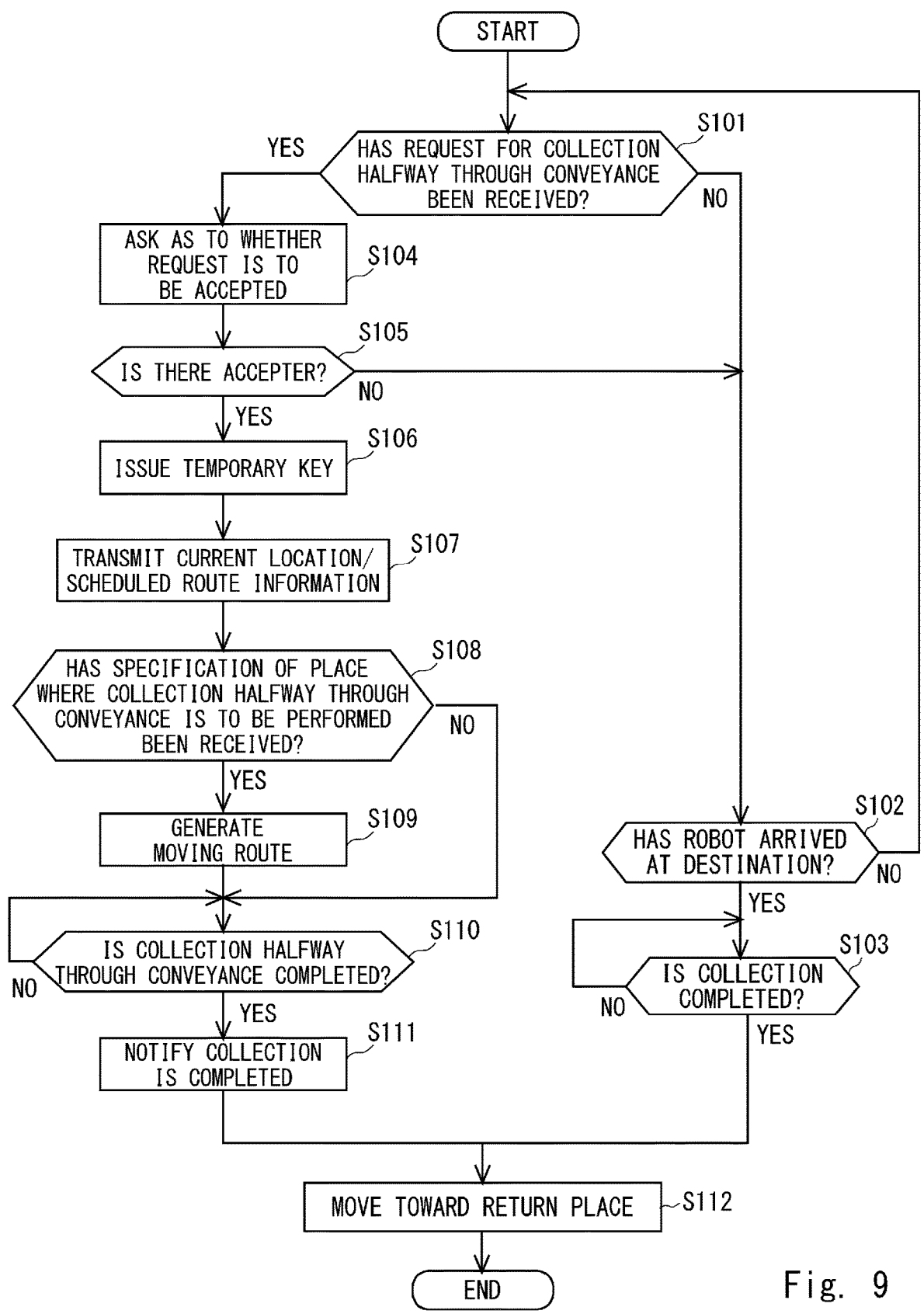
FIG. 9 is a flowchart regarding conveyance processes performed by the conveyance robot according to a first example.

Next, conveyance processes performed by the conveyance robot 100 will be described, with a focus on processes related to the collection of the conveyance object halfway through conveyance of the conveyance object. FIG. 9 is a flowchart regarding the conveyance processes performed by the conveyance robot 100 in the first example. The process flow shown in FIG. 9 starts from the point in time when a shipping worker has packed the conveyance object into the storage part and input information about the scheduled recipient, the content of the conveyance object, the conveyance destination, and the like, and then the conveyance robot 100 has started moving toward the destination. Note that the following process flow shows the overall process flow, and the description of some processes may be omitted, or optional processes may be described in addition to essential processes.

The reception unit 201 periodically checks whether a request signal for requesting a third party to collect the conveyance object halfway through conveyance of the conveyance object has been received from the user terminal 300 of the scheduled recipient while the conveyance robot 100 is autonomously moving toward the destination (Step S101). If it is confirmed that the request signal has not been received, the process proceeds to Step S102, where the control unit 200 determines whether the conveyance robot 100 has arrived at the set destination. If the control unit 200 determines that the conveyance robot 100 has not yet arrived, the process returns to Step S101, while if the control unit 200 determines that the conveyance robot 100 has already arrived, the process proceeds to Step S103. In Step S103, the control unit 200 causes the conveyance robot 100 to stop moving and wait until the conveyance object is collected. If the control unit 200 determines that the conveyance object has been collected, the process proceeds to Step S112.

If the reception unit 201 confirms that the request signal has been received in Step S101, the process proceeds to Step S104, and the issuance unit 202 transmits, as described above, a notification signal for notifying the user terminals 400 of the candidates for the accepter, such as the designated candidate for the accepter or the candidates for the accepter registered in the registration list 242, about the reception of the request for collection of the conveyance object halfway through conveyance of the conveyance object. The transmission of the notification signal to the user terminal 400 is substantially a process of asking the candidate for the acceptor as to whether he/she accepts the request for collection of the conveyance object halfway through conveyance of the conveyance object.

In Step S105, the issuance unit 202 checks whether the reception unit 201 has received, within a predetermined period of time, the acceptance signal from any of the user terminals 400 to which the notification signals have been transmitted. If the issuance unit 202 confirms that the reception unit 201 has not received the acceptance signal, it transmits a notification that "there is no accepter" to the user terminal 300 of the scheduled recipient, and then the process proceeds to Step S102. If the issuance unit 202 confirms that the reception unit 201 has received the acceptance signal, the process proceeds to Step S106.

In Step S106, the issuance unit 202 issues a temporary key to the user terminal 400 of the accepter. Further, in Step S107, the issuance unit 202 transmits the current location information and the scheduled route information of the conveyance robot 100 to the user terminal 400. In Step S108, the control unit 200 checks whether the place where the conveyance object is to be collected halfway through conveyance of the conveyance object has been specified by the accepter. If the control unit 200 confirms that the place has been specified, the process proceeds to Step S109, where the control unit 200 newly generates a moving route to the specified place where the conveyance object is to be collected halfway through conveyance of the conveyance object and transmits information about the generated moving route to the user terminal 400. After that, the conveyance robot 100 moves to the specified place where the conveyance object is to be collected halfway through conveyance of the conveyance object. If the control unit 200 confirms that the place has not been specified, it causes the conveyance robot 100 to move toward the initially determined destination.

Both when the conveyance robot 100 moves toward the specified place where the conveyance object is to be collected halfway through conveyance of the conveyance object and when the conveyance robot 100 moves toward the initially determined destination, the process then proceeds to Step S110, where the control unit 200 causes the conveyance robot 100 to wait for the conveyance object to be collected by the accepter. If the control unit 200 determines that the conveyance object has been collected, the process proceeds to Step S111, where the control unit 200 notifies the user terminal 300 of the scheduled recipient that the conveyance object has been collected halfway through conveyance of the conveyance object. After the scheduled recipient confirms the notification through the user terminal 300, he/she may wait for the accepter to deliver the conveyance object to him/her.

In Step S112, the control unit 200 causes the conveyance robot 100 to move toward a set return place. The return place may be set by the shipping worker at the time of departure or by the accepter or the recipient. Further, a charging station or the like may be set in advance as the return place. When the movement of the conveyance robot 100 to the return place is completed, the control unit 200 ends the series of conveyance processes.

Next, a second example is described. In the first example, the issuance unit 202 first transmits a request signal to the user terminal 400 of the candidate for the accepter, and when the acceptance signal is transmitted from the specific user terminal 400, the issuance unit 202 issues a temporary key only to the specific user terminal 400. In the second example, the issuance unit 202 issues temporary keys to the user terminals 400 of all the candidates for the accepter without confirming their acceptances.

In the second example, the example of the user interface screen of the user terminal 300 of the scheduled recipient for requesting that the conveyance object be collected halfway through conveyance of the conveyance object and the processing done until a request signal is transmitted to the conveyance robot 100 are similar to those in the first example which have been described with reference to FIG. 5. When the reception unit 201 of the conveyance robot 100 receives the request signal, it notifies the issuance unit 202 about the receiving of the signal, and the issuance unit 202 issues the temporary key to the user terminal 400 of the candidate for the accepter in response to this notification. The second example is effective particularly when the candidate for the accepter is not designated by the scheduled recipient. Thus, it is assumed in the following description that a person who satisfies a predetermined condition, for example, a person registered in the registration list 242 or a person present within a certain range from where the conveyance robot 100 is located, is selected as the candidate for the accepter.

Figure 10:
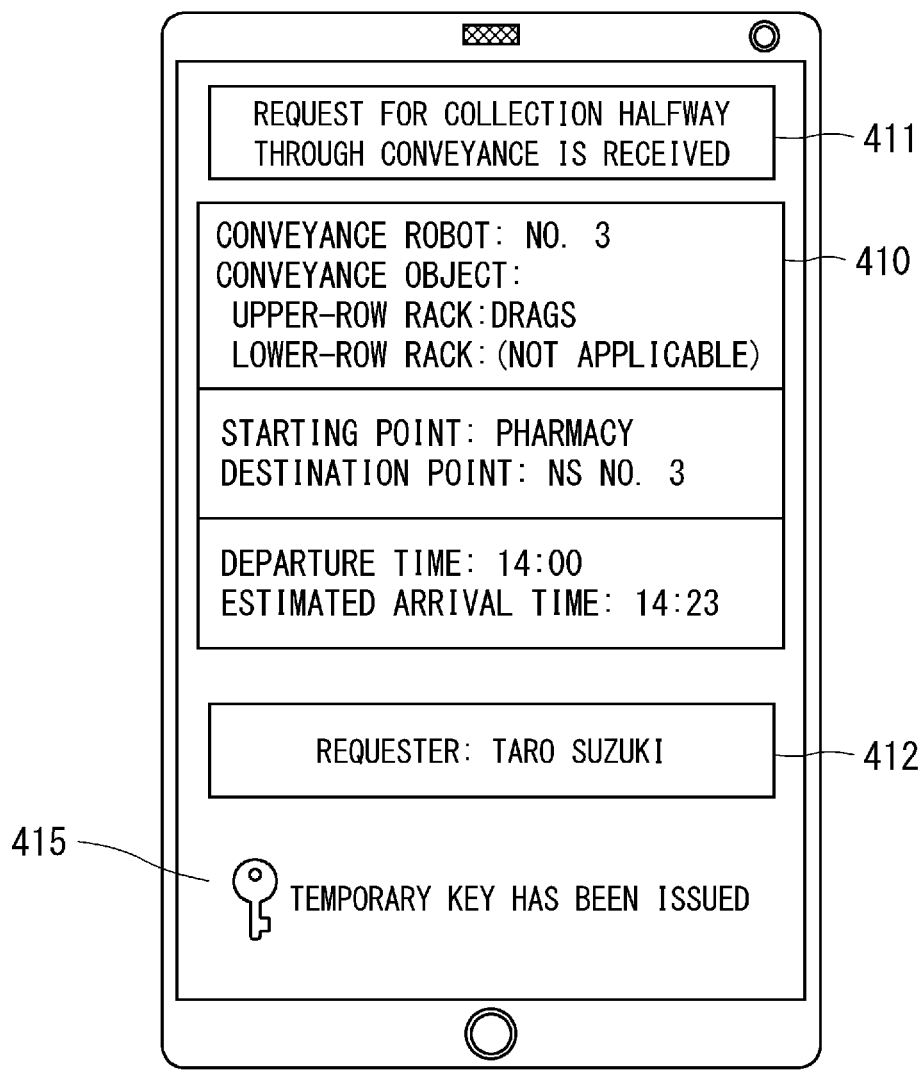
FIG. 10 shows an example of the user interface screen when a request for the collection of the conveyance object halfway through conveyance of the conveyance object is received.

When the issuance unit 202 issues the temporary key to the user terminal 400 of the candidate for the accepter, the user terminal 400 to which the temporary key has been issued displays the notification screen for notifying that the request for the collection of the conveyance object halfway through conveyance of the conveyance object has been received on the display panel 401. FIG. 10 shows an example of the user interface screen displayed on the display panel 401 of the user terminal 400 when the request for the collection of the conveyance object halfway through conveyance of the conveyance object is received.

As shown in FIG. 10, the status window 410, the report window 411, the requester window 412, and the key status 415 are arranged on the display panel 401. The status window 410, the report window 411, and the requester window 412 are similar to those in the example of the user interface screen shown in FIG. 6 in the first example. The key status 415 indicates that, in the form of text and by using an icon, a temporary key is issued by the conveyance robot 100 and is stored in the user terminal 400.

That is, when there are a plurality of candidates for the accepter, the temporary key is issued by the conveyance robot to the user terminal 400 of each candidate. Thus, the candidate for the accepter who accepts the request for the collection of the conveyance object halfway through conveyance of the conveyance object does not need to inform the conveyance robot 100 about the acceptance, and may go, as the accepter, to the place where the moving conveyance robot 100 is located. Note that the issuance unit 202 issues the temporary key and also transmits the current location information and the scheduled route information of the conveyance robot 100 to the user terminal 400. The accepter can display the map window 450 shown in FIG. 7 on the display panel 401 by performing, for example, a flick operation. By confirming the map window 450, the accepter can determine where to go in order to meet the conveyance robot 100.

Figure 11:
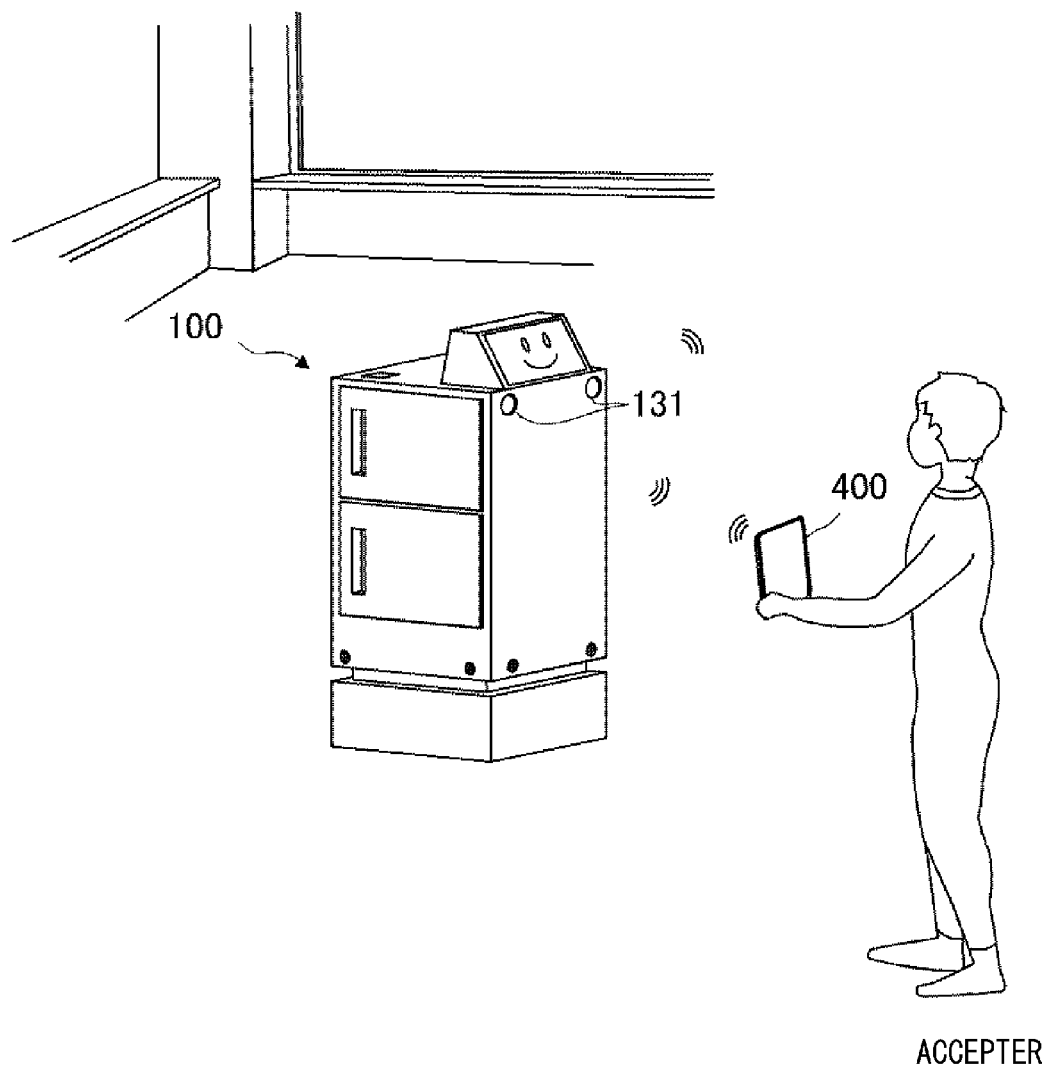
FIG. 11 is a diagram showing a state in which an accepter approaches the conveyance robot.

FIG. 11 is a diagram showing a state in which the accepter approaches the conveyance robot 100. The control unit 200 of the conveyance robot 100 monitors whether there is an approaching person by using the stereo camera 131 or the ultrasonic sensor 132, and performs an avoidance operation or reduces the speed of the conveyance robot 100 depending on a situation. Further, if there is an approaching person, the control unit 200 attempts to establish communication with the user terminal 400 which may be possessed by the approaching person by using the near field communication unit of the communication unit 250. Then, when communication is successfully established and it is confirmed that at least the temporary key is stored in the user terminal 400, the control unit 200 causes the conveyance robot 100 to temporarily stop if it is moving at that time.

The acquisition unit 203 causes the stereo camera 131 to shoot a person who possesses the user terminal 400 and acquires imaging data. The imaging data at this time may not be stereo image data and may instead be image data generated by shooting using one camera unit. The transmission unit 204 transmits the image data acquired by the acquisition unit 203 to the user terminal 300 of the scheduled recipient via the communication unit 250, and asks the scheduled recipient whether he/she wants to give permission to perform unlocking.

Figure 12:
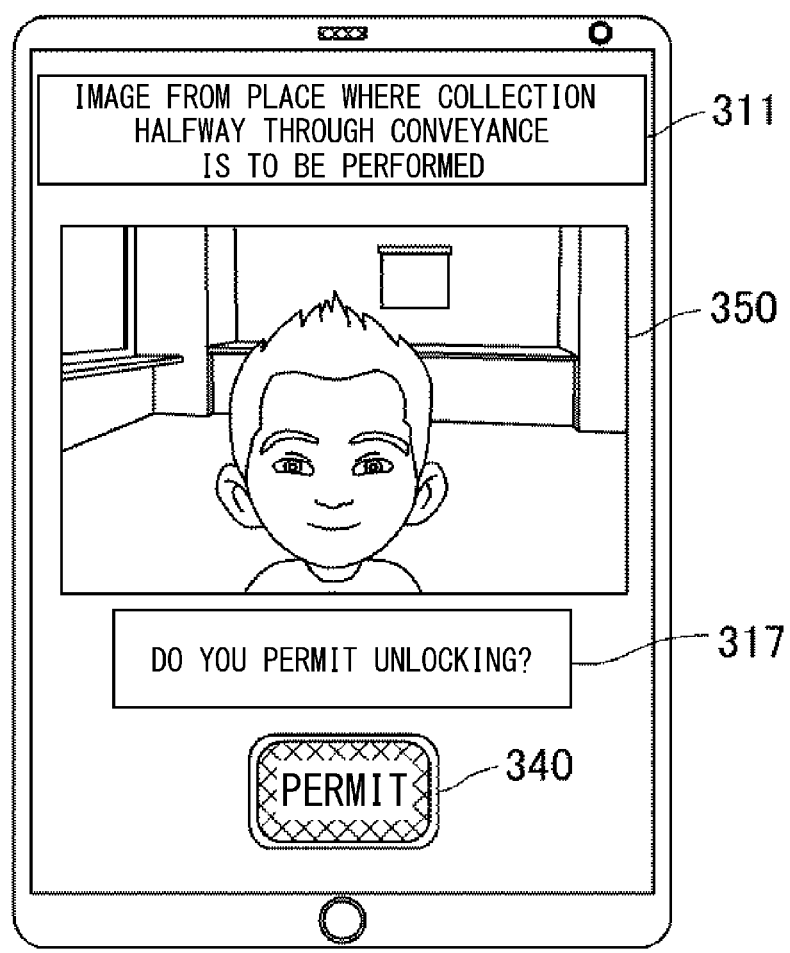
FIG. 12 is an example of the user interface screen for receiving permission to perform unlocking.

FIG. 12 shows an example of the user interface screen for receiving permission to perform unlocking, the user interface screen being displayed on the display panel 301 of the user terminal 300. As shown in FIG. 12, a report window 311, an image window 350, an inquiry window 317, and a permission button 340 are arranged on the display panel 301. The report window 311 displays information which the conveyance robot 100 has sent a notification about, and in FIG. 12, it displays information indicating that the image data has been delivered from the place where the conveyance object is to be collected halfway through conveyance of the conveyance object. The image window 350 displays an image of the image data which the user terminal 300 has received from the conveyance robot 100. The inquiry window 317 displays the information that the scheduled recipient is requested to determine whether he/she wants to give permission to perform unlocking.

The permission button 340 is a button for generating a permission signal indicating that the scheduled recipient intends to give permission to perform unlocking by a tap operation of the scheduled recipient, and "permit" is displayed in text form on the permission button 340. Tapping the permission button 340 causes the permission signal to be transmitted to the conveyance robot 100 via the system server 500.

The unlocking control unit 205 of the conveyance robot 100 switches the state of the terminal reading unit 123 to a state in which it can perform reading when the reception unit 201 receives the permission signal from the user terminal 300. At this time, the unlocking control unit 205 may display the information that the temporary key can be read on the display panel 122. Then, when the accepter brings the user terminal 400 close to the terminal reading unit 123, the terminal reading unit 123 reads the temporary key stored in the user terminal 400. The unlocking control unit 205 unlocks the upper-row electronic lock 140 when the information of the temporary key read by the terminal reading unit 123 coincides with the unlocking information of the upper-row electronic lock 140, and unlocks the lower-row electronic lock 150 when the information of the temporary key read by the terminal reading unit 123 coincides with the unlocking information of the lower-row electronic lock 150.

In this way, if the temporary key is first issued to the user terminal 400 to which the temporary key can be issued, the accepter can omit the operation for showing that he/she intends to accept a request for the collection of the conveyance object halfway through conveyance of the conveyance object, and easily respond to the request. Further, the scheduled recipient who has requested the collection of the conveyance object halfway through conveyance of the conveyance object can be assured that he/she can confirm, before the unlocking of the electronic lock, who will collect the conveyance object halfway through conveyance of the conveyance object. In addition, the scheduled recipient can confirm from whom he/she receives the conveyance object. Further, if the scheduled recipient can confirm that the accepter is not a person who is suitable for the collection of the conveyance object halfway through conveyance of the conveyance object, he/she can choose not to give permission to perform unlocking.

Note that in the above example, the issuance unit 202 first issues the temporary key to the user terminal 400 to which the temporary key can be issued, the issuance unit 202, however, may first notify the user terminal 400 about the reception of the request for the collection of the conveyance object halfway through conveyance of the conveyance object, and issue, when the permission signal from the user terminal 300 is received, the temporary key to the user terminal 400 of the accepter who has come to collect the conveyance object halfway through conveyance of the conveyance object. In this case, when communication with the user terminal 400 possessed by the person who approaches the conveyance robot 100 is successfully established, the control unit 200 may check whether this user terminal is the terminal to which the request for the collection of the conveyance object halfway through conveyance of the conveyance object has been sent.

Further, if the temporary key is first issued to the user terminal 400 to which the temporary key can be issued, asking the scheduled recipient whether he/she wants to give permission to perform unlocking may be omitted. By this configuration, the accepter who has accepted the request for the collection of the conveyance object halfway through conveyance of the conveyance object can immediately collect the conveyance object by using the issued temporary key. Note that even in this case, it is desirable that the scheduled recipient be able to confirm who has accepted the request for the collection of the conveyance object halfway through conveyance of the conveyance object. Therefore, when the electronic lock is unlocked by the issued temporary key, the acquisition unit 203 acquires imaging data as a status report of the collection of the conveyance object halfway through conveyance of the conveyance object, and the transmission unit 204 transmits the imaging data to the user terminal 300 of the scheduled recipient.

Figure 13:
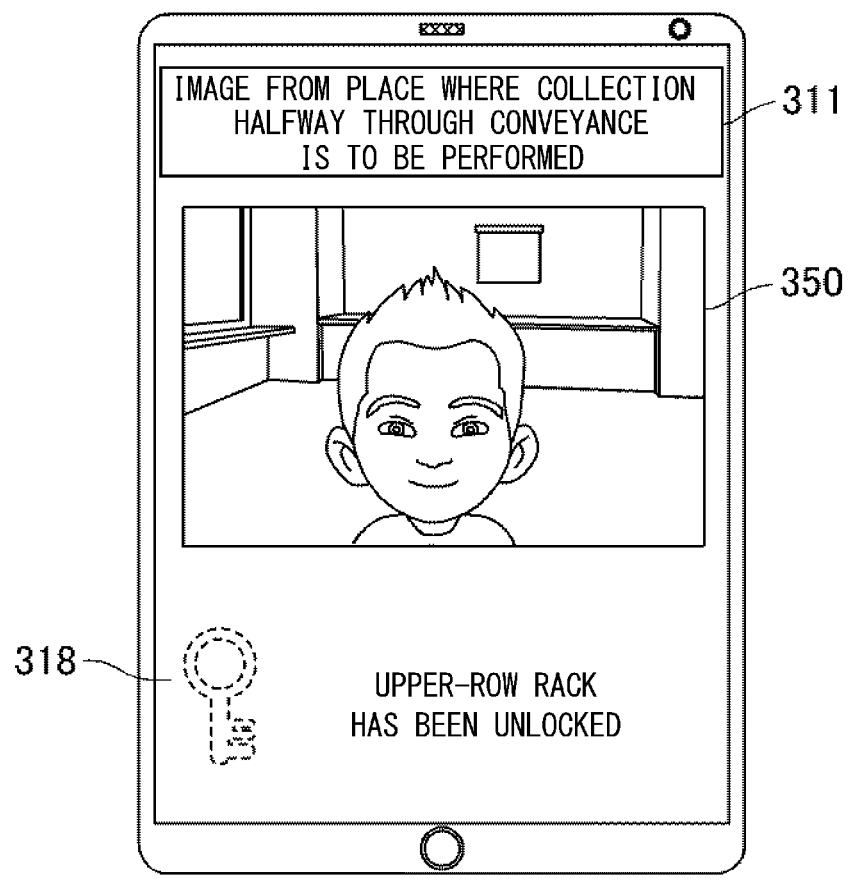
FIG. 13 is an example of the user interface screen for receiving a status report of the collection of the conveyance object halfway through conveyance of the conveyance object.

FIG. 13 is an example of the user interface screen for receiving a status report of the collection of the conveyance object halfway through conveyance of the conveyance object, the user interface screen being displayed on the display panel 301 of the user terminal 300. As shown in FIG. 13, the report window 311, the image window 350, and a rack status 318 are arranged on the display panel 301. The report window 311 displays the information that an image has been sent from the place where the conveyance object is to be collected halfway through conveyance of the conveyance object. The image window 350 displays an image of the image data which the user terminal 300 has received from the conveyance robot 100. The rack status 318 indicates that the upper-row rack is unlocked in the form of text and by using an icon. The scheduled recipient can confirm who has accepted the request for the collection of the conveyance object halfway through conveyance of the conveyance object through the above-described user interface screen.

It may be determined based on the attribute of the conveyance object whether to omit asking the scheduled recipient whether he/she wants to give permission to perform unlocking; that is, whether to perform unlocking when the permission signal is received or whether to perform unlocking without having to receive the permission signal. For example, in the case of the conveyance object that requires a strict control such as a drug, processes are performed according to a flow for performing unlocking when the permission signal is received, while in the case of the conveyance object that does not require a strict control, processes are performed according to a flow for performing unlocking without having to receive the permission signal. Whether or not the conveyance object requires a strict control may be determined by the shipping worker specifying by an input at the time of shipment, or may be determined by specifying the conveyance object in a specified list. Alternatively, for example, if it is determined that the upper-row storage part stores the conveyance object that requires a strict control, and the lower-row storage part stores the conveyance object that does not require a strict control, unlocking may be performed for the upper-row storage part when the permission signal is received, and unlocking may be performed for the lower-row storage part without having to receive the permission signal.

Figure 14:
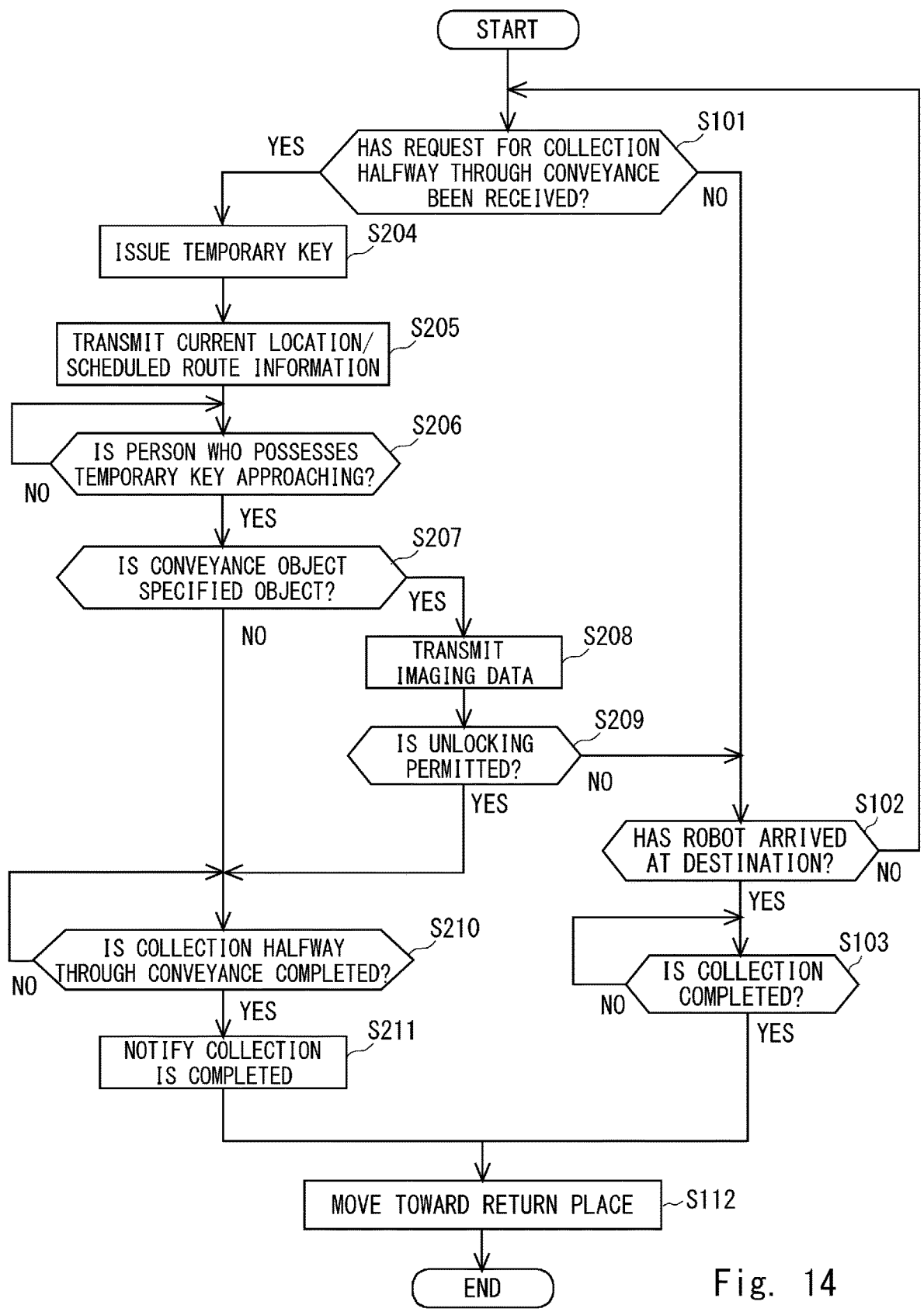
FIG. 14 is a flowchart regarding conveyance processes performed by the conveyance robot according to a second example.

FIG. 14 is a flowchart regarding the conveyance processes performed by the conveyance robot 100 in the second example. The process flow shown in FIG. 14, like the process flow shown in FIG. 9, starts from the point in time when a shipping worker has packed the conveyance object into the storage part and input information about the scheduled recipient, the content of the conveyance object, the conveyance destination, and the like, and then the conveyance robot 100 has started moving toward the destination. Note that the following process flow shows the overall process flow, and the description of some processes may be omitted or optional processes may be described in addition to essential processes. Further, the same step numbers are given to the same processes as those in the process flow shown in FIG. 9, and the descriptions thereof will be omitted.

If the reception unit 201 has received a request signal for requesting that the conveyance object be collected halfway through conveyance of the conveyance object in Step S101, the process proceeds to Step S204, where the issuance unit 202 issues a temporary key to the user terminal 400 of the candidate for the accepter, for example, the candidate for the accepter registered in the registration list 242. Further, in Step S205, the issuance unit 202 transmits current position information and scheduled route information of the conveyance robot 100 to the user terminal 400 of the candidate for the accepter.

In Step S206, the control unit 200 checks whether a person who possesses the user terminal 400 in which the temporary key is stored is approaching the conveyance robot 100. If the control unit 200 confirms that the person is approaching, the control unit 200 causes the conveyance robot 100 to temporarily stop if it is moving at that time. Further, in Step S207, the unlocking control unit 205 checks whether the conveyance object to be collected halfway through conveyance of the conveyance object is a specified conveyance object. If the unlocking control unit 205 confirms that it is the specified conveyance object, the process proceeds to Step S208, where the acquisition unit 203 acquires imaging data of the person, and the transmission unit 204 transmits the imaging data to the user terminal 300 of the scheduled recipient. Then, in Step S209, if the reception unit 201 receives the permission signal indicating that permission to perform unlocking is given from the user terminal 300 within a predetermined period of time, the unlocking control unit 205 sets the terminal reading unit 123 so that it can perform reading, and then the process proceeds to Step S210. If the reception unit 201 receives no permission signal, the process proceeds to Step S102.

In Step S210, the terminal reading unit 123 reads the temporary key stored in the user terminal 400 when the accepter brings the user terminal 400 close to the terminal reading unit 123. The unlocking control unit 205 unlocks the electronic lock corresponding to the read information. Then, the performance of the collection by the accepter is awaited. For example, when a certain period of time has elapsed, it is determined that the collection has been completed, and then the process proceeds to Step S211. In Step S211, the user terminal 300 of the scheduled recipient is notified that the conveyance object has been collected halfway through conveyance of the conveyance object. In particular, when the conveyance object is not a specified object and unlocking is performed without having to receive a permission signal, the acquisition unit 203 acquires imaging data, and the transmission unit 204 transmits the imaging data to the user terminal 300 of the scheduled recipient. When the notification that the collection is completed has been sent, the process proceeds to Step S112, and then the series of conveyance processes is ended.

The first and the second examples have been described in this embodiment. Whether the conveyance robot 100 is to be configured to operate in accordance with the first example or the second example may be determined according to the environment in which the conveyance robot 100 is used, the properties of the conveyance object to be conveyed, the performance of the conveyance robot 100, and the like. Further, a mode of operating in the first example and a mode of operating in the second example may be switched by a user depending on the situation.

Note that in the above explanation of the first and the second examples, the terminal of the scheduled recipient of the conveyance object has been referred to as the user terminal 300, and the terminal of the accepter or the candidate for the accepter has been referred to as the user terminal 400. However, as the owner of the terminal may be the scheduled recipient, the accepter, or the candidate for the accepter depending on the situation, the terminal may have both the function of the user terminal 300 and that of the user terminal 400. The above user terminals can be implemented, for example, by tablet terminals or smartphones.

Further, as the temporary key is a temporary electronic key issued to a third party who is not the scheduled recipient, the temporary key may be invalidated when a certain period of time has elapsed. For example, the unlocking control unit 205 prevents the electronic lock from being unlocked even if the terminal reading unit 123 reads the temporary key regarding which 20 minutes or more have elapsed since the issuance unit 202 issued it. Further, the temporary key may be invalidated when the temporary key is once used to perform unlocking.

Further, a method for determining the user terminal 400 to which the temporary key is to be issued is not limited to the method described above, and for example, the scheduled recipient may be actively involved in the determination. For example, a map window including the current position of the conveyance robot is displayed on the display panel 301 of the user terminal 300, and the detected position of the user terminal 400 is superimposed on the map window. On such a user interface screen, the scheduled recipient may tap one of the user terminals 400, thereby specifying the user terminal 400 to which the temporary key is to be issued.

The conveyance robot 100 described above executes most of the processes related to conveyance by itself. However, another embodiment in which the conveyance robot executes only simple processes in response to a command sent from the system server in order to reduce the processes executed by the conveyance robot may be adopted. FIG. 15 is a diagram for explaining a conveyance control system according to the above embodiment. The conveyance control system includes a system server 500' and a conveyance robot 100' connected to the system server 500' via the network 600 and the communication unit 610.

The system server 500' includes an operation unit 510, a memory 540, and a communication unit 550. The operation unit 510 is, for example, a CPU, and executes a control program loaded from the memory 540, thereby controlling the entire system.

The memory 540, which is a nonvolatile storage medium, may be, for example, a hard disc drive. The memory 540 stores, in addition to the control program for controlling the conveyance control system, various parameter values, functions, lookup tables, and the like used for the control. In particular, the memory 540 stores an environmental map 541 similar to the environmental map 241 described above and a registration list 542 similar to the registration list 242 described above.

The communication unit 550 is a communication device to be connected to the network 600. The operation unit 510 transmits and receives various kinds of instruction signals and information to and from the conveyance robot 100' and the user terminals 300 and 400 via the communication unit 550, the network 600, and the communication unit 610.

Like the control unit 200 described above, the operation unit 510, which functions as a function operation unit, also functions as a reception unit 511, an issuance unit 512, an acquisition unit 513, a transmission unit 514, and an unlocking control unit 515. The reception unit 511 receives a request signal for requesting a third party to collect the conveyance object halfway through conveyance of the conveyance object from the scheduled recipient of the conveyance object. When the reception unit 511 receives the request signal, the issuance unit 512 issues a temporary key to the user terminal 400 of the candidate for the accepter in accordance with the set condition. The acquisition unit 513 acquires, from the conveyance robot 100', imaging data obtained by the stereo camera 131 shooting the accepter who has come to collect the conveyance object halfway through conveyance of the conveyance object. The transmission unit 514 transmits the imaging data acquired by the acquisition unit 513 to the user terminal 300 of the scheduled recipient. When the transmission unit 514 has transmitted the imaging data and then the reception unit 511 receives the permission signal from the user terminal 300, the unlocking control unit 515 transmits a signal indicating that permission to perform unlocking with the temporary key is given to the control unit 200 of the conveyance robot 100'. As the control unit 200 of the conveyance robot 100' can delegate these function operations to the operation unit 510 of the system server 500, the control unit 200 can concentrate on processing of which the load is light or other processing.

In the conveyance control system thus constructed, the conveyance robot 100' may operate in a way similar to the way the above-described conveyance robot 100 operates. As to which of the conveyance robot, the system server, and the user terminal performs which function operation, it may be adjusted in accordance with the operation capability of each apparatus, the stability of communication, the purpose of use of the entire system, and the like.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance control system configured to control a conveyance robot to autonomously move and convey a conveyance object to a destination, the conveyance control system comprising:
    a reception unit configured to receive, from a scheduled recipient of the conveyance object, a request signal for requesting a third party to collect the conveyance object halfway through conveyance of the conveyance object; and
    an issuance unit configured to issue, to a terminal of the third party, a temporary electronic key for enabling the conveyance object to be taken out from the conveyance robot based on a set condition when the reception unit receives the request signal.

2. The conveyance control system according to claim 1, wherein the issuance unit issues the electronic key to the terminal of the third party located within a reference range from the conveyance robot.

3. The conveyance control system according to claim 1, wherein the issuance unit issues the electronic key to the terminal of the third party registered in a registration list.

4. The conveyance control system according to claim 1, further comprising:
    an acquisition unit configured to acquire imaging data obtained by shooting the third party who has come to collect the conveyance object halfway through conveyance of the conveyance object;
    a transmission unit configured to transmit the imaging data to a terminal of the scheduled recipient; and
    an unlocking control unit configured to, when the transmission unit has transmitted the imaging data and then the reception unit receives a permission signal indicating that permission to perform unlocking is given from the scheduled recipient, perform unlocking with the electronic key.

5. The conveyance control system according to claim 4, wherein the unlocking control unit determines, based on an attribute set in the conveyance object, whether to perform unlocking with the electronic key when the reception unit receives the permission signal or to perform unlocking with the electronic key without the reception unit receiving the permission signal.

6. The conveyance control system according to claim 5, wherein the transmission unit transmits the imaging data to the terminal of the scheduled recipient even when the unlocking control unit performs unlocking with the electronic key without the reception unit receiving the permission signal.

7. A non-transitory computer readable medium storing a conveyance control program for controlling a conveyance robot to autonomously move and convey a conveyance object to a destination, the conveyance control program causing a computer to execute:
- a movement step of causing the conveyance robot to move toward the destination;
- a check step of checking, while the movement step is being executed, whether a request signal for requesting a third party to collect the conveyance object halfway through conveyance of the conveyance object is received from a scheduled recipient of the conveyance object; and
- an issuance step of issuing, to a terminal of the third party, a temporary electronic key for enabling the conveyance object to be taken out from the conveyance robot based on a set condition when it is confirmed that the request signal has been received in the check step.

8. A conveyance control method for controlling a conveyance robot to autonomously move and convey a conveyance object to a destination, the conveyance control method comprising:
- causing the conveyance robot to move toward the destination;
- checking, during the movement of the conveyance robot, whether a request signal for requesting a third party to collect the conveyance object halfway through conveyance of the conveyance object is received from a scheduled recipient of the conveyance object; and
- issuing, to a terminal of the third party, a temporary electronic key for enabling the conveyance object to be taken out from the conveyance robot based on a set condition when it is confirmed that the request signal has been received.

* * * * *